United States Patent
Jacobson et al.

(10) Patent No.: US 6,787,019 B2
(45) Date of Patent: Sep. 7, 2004

(54) LOW TEMPERATURE ALKALI METAL ELECTROLYSIS

(75) Inventors: Stephen Ernest Jacobson, Princeton, NJ (US); Dennie Turin Mah, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 128 days.

(21) Appl. No.: 09/989,880

(22) Filed: Nov. 21, 2001

(65) Prior Publication Data

US 2003/0094379 A1 May 22, 2003

(51) Int. Cl.$^7$ .............................................. C25C 3/02
(52) U.S. Cl. ..................... 205/406; 205/407; 205/408; 205/409
(58) Field of Search ................................ 205/406, 407, 205/408, 409

(56) References Cited

U.S. PATENT DOCUMENTS

| | | | |
|---|---|---|---|
| 3,472,745 A | 10/1969 | Heredy | |
| 4,156,635 A | 5/1979 | Cooper et al. | |
| 4,389,287 A | 6/1983 | Skala | |
| 4,463,071 A | 7/1984 | Gifford et al. | |
| 4,740,279 A * | 4/1988 | Müller et al. | ............... 205/407 |
| 4,853,094 A | 8/1989 | Honders et al. | |
| 5,064,513 A | 11/1991 | Boutin et al. | |
| 5,855,809 A | 1/1999 | Angell et al. | |
| 6,368,486 B1 * | 4/2002 | Thompson et al. | ......... 205/406 |

FOREIGN PATENT DOCUMENTS

JP        04088188 A        3/1990

OTHER PUBLICATIONS

Plating and stripping of sodium from a room temperature 1,2–dimethyl–3–propylimidazolium chloride melt, J. Electrochem. Soc. vol. 143, No. 7, pp. 2262–2266, Jul. 1996.

Room–temperature Ionic liquids. Solvents for synthesis and catalysis, Thomas Welton, *Chemical Reviews*, 99, 2071–2084 (1999).

Room Temperature Inorganic "Quasi–MoltenSalts" as Alkali–Metal electrolytes, K. XU et al, J. Electrolchem. Soc. vol. 143, No. 11, Nov. 1999.

* cited by examiner

*Primary Examiner*—Roy King
*Assistant Examiner*—Harry D. Wilkins, III

(57) ABSTRACT

A low temperature electrolysis process that can be used for producing an alkali metal from an alkali metal halide is provided, which comprises electrolyzing an electrolyte composition comprising at least one alkali metal halide and a co-electrolyte comprising (a) a halide or halides of Group IIIA, Group IB, or Group VIII metals and (b) a halide-donating compound.

32 Claims, 1 Drawing Sheet

LOW TEMPERATURE ALKALI METAL ELECTROLYSIS

FIELD OF THE INVENTION

The invention relates to an electrolysis process and electrolytes therefor for producing an alkali metal.

BACKGROUND OF THE INVENTION

Alkali metals are highly reactive elements and are not found in elemental form in nature. Typical reducing agents, such as hydrogen, are not strong enough to reduce the alkali metals from their compounds to the metallic state. Electrolytic reduction is necessary and was used historically in the classic experiments leading to the discovery of the alkali metals in elemental form in 1807 by Sir Humphrey Davy. Electrolytic reduction is used for industrial production of the alkali metals. The currently used process, on a worldwide basis, is the so-called "Downs" Process, which was introduced in the early part of the 20th century for the production of sodium and lithium from their chlorides.

The Downs Process uses a molten salt electrolyte consisting of a mixture of NaCl, $CaCl_2$ and $BaCl_2$ in order to reduce the melting temperature of the electrolyte to slightly below 600° C. This makes the process more practical compared to using pure NaCl which has a much higher melting point of about 800° C. Nevertheless, operating an electrolytic process at such temperature is difficult and presents numerous operating constraints. Because of the high operating temperature of the Downs Process, the cell design uses concentrically cylindrical cathodes, wire mesh diaphragms, and anodes rather than the much more space efficient stacked multiple flat electrode and diaphragm element configuration that is normally used in electrochemical engineering practice. Furthermore, the high operating temperature would make a flat wire-mesh steel diaphragm so soft that it would be mechanically unstable and flap back and forth between anode and cathode causing partial shorting/arcing and thereby causing holes to be burned in the diaphragm. Holes in the diaphragm would allow back mixing of sodium produced at the cathode and chlorine produced at the anode, thereby causing low current efficiency of the cell. On the other hand, the concentric cylindrical configuration of the steel diaphragm between the electrodes avoids this difficulty because a wire-mesh cylinder is mechanically much stiffer and mechanically more stable than a flat wire-mesh screen of the same kind.

The above-described concentric cylindrical cell design of the Downs Process, necessitated by the high operating temperature of about 600° C., also means that the Downs cell has very poor space efficiency. This translates directly into high capital and operating cost per unit production.

The high operating temperature of the Downs cell in combination with the fact that the molten mixed salt electrolyte has a freezing temperature only about 20° C. below the cell operating temperature makes smooth operation of the cells difficult. Cell 'freeze-ups' and other "upsets" are frequent and result in unusually high operating labor requirements for an industrial electrolytic process. This in turn is also the reason why the Downs Process is not amenable to automation. Lithium is currently produced by a modification of the Downs process.

In recent years fundamental physico-chemical studies have been carried out on battery applications using electrolytes based on non-aqueous solvents for alkali metal chlorides that do not crystallize at ambient temperature. See J. Electrochem. Soc. Vol. 143 No. 11, pages 3548–3554, November 1996; and U.S. Pat. No. 5,855,809, disclosures of which are incorporated by reference.

There is an increasing need to develop an electrolytic process that can be used to produce an alkali metal more economically. There is also a need to develop a process that can improve operability such as, for example, making automation possible.

SUMMARY OF THE INVENTION

An electrolysis process that can be used for producing an alkali metal from an alkali metal halide is provided, which comprises electrolyzing an electrolyte composition comprising, or produced by combining, at least one alkali metal halide and a co-electrolyte in which the co-electrolyte comprises or is produced by combining (a) at least one halide of Group IIIA, Group IB, or Group VIII and (b) a halide-donating compound.

DETAILED DESCRIPTION OF THE INVENTION

Figure 1:
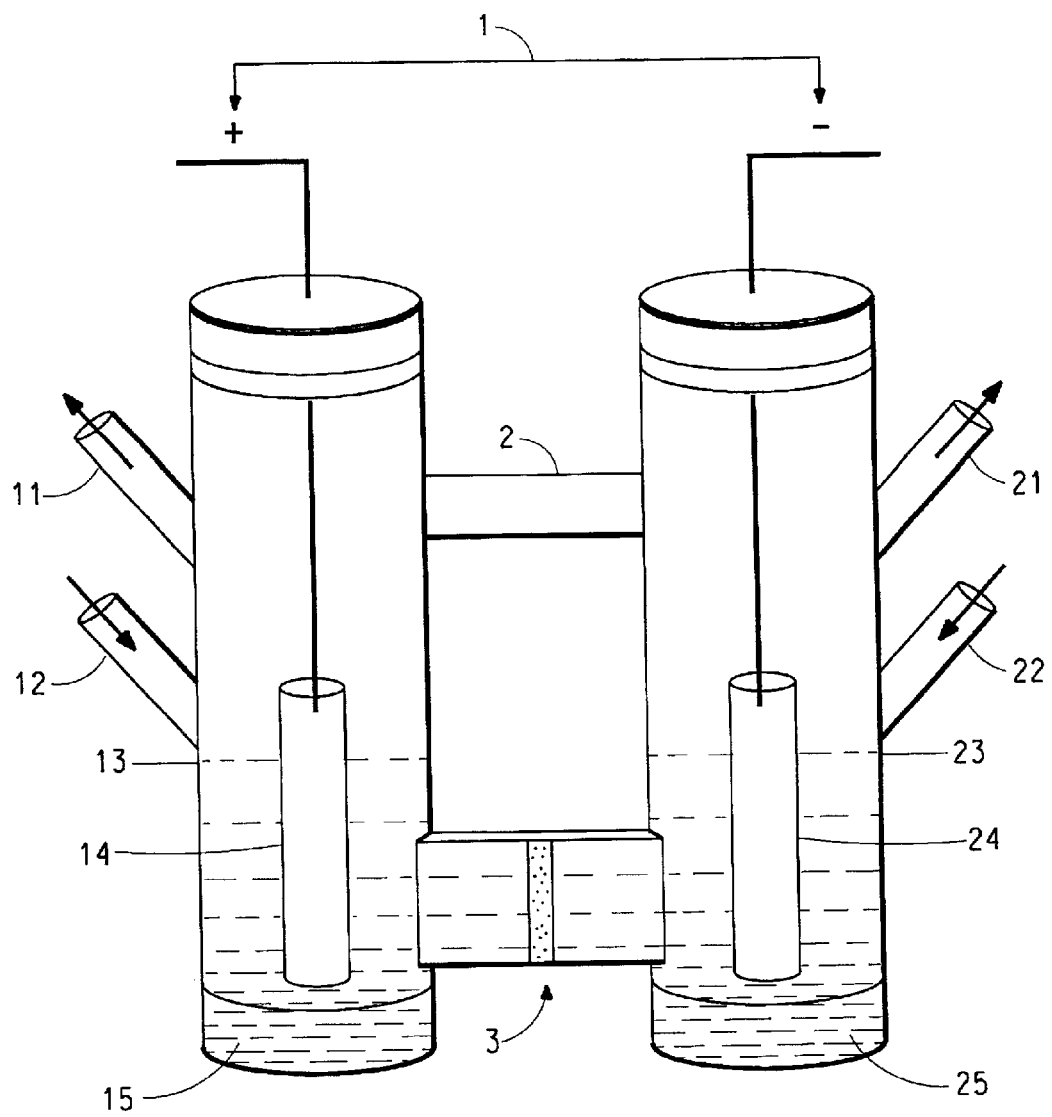
FIG. 1 is a laboratory H cell used for electrolysis in the Examples section of the application.

The electrolysis is carried out at a low temperature. The term "low temperature" refers to a temperature lower than about 200° C. It can be in the range of from about 20° C. to 200° C., preferably about 50° C. to 150° C., and most preferably about 100° C. to 150° C. The electrolysis is preferably carried out under a condition that produces a molten layer of alkali metal at the cathode and hydrogen at the anode.

The invention electrolysis process can also comprise or consist essentially of electrolyzing an electrolyte composition comprising or consisting essentially of at least one alkali metal halide and a co-electrolyte consisting essentially of (a) at least one halide of Group IIIA, Group IB, or Group VIII and (b) a halide-donating compound.

Any alkali metal halide can be used in the invention. The term "alkali metal" refers to lithium, sodium, potassium, rubidium, cesium, francium, or combinations of two or more thereof. The preferred alkali metals are sodium and lithium. Most preferred is sodium. Alkali metal produced in the electrolysis process disclosed herein is preferably in bulk quantity that can be transported in substantially pure form. The presently preferred alkali metal halide is sodium chloride, widely available and used to produce sodium by electrolysis.

The halide for the co-electrolyte is a halide or halides of Group IB, Group IIIA, or Group VIII elements, or combinations of two or more thereof, hereinafter referred to as "co-electrolyte halide(s)", The term "Group IB", "Group IIIA", or "Group VIII" used in the invention refers to the CAS version of the Periodic Table of the Elements, CRC Handbook of Chemistry & Physics, 67th edition, 1986–1987, CRC Press, Boca Raton, Fla. Examples of suitable Group IB halides include copper halide such as copper chloride and copper bromide; silver halide such as silver chloride; and gold halide such gold chloride. Examples of Group IIIA halides include aluminum halide such as aluminum chloride and aluminum bromide; boron halide such as boron chloride; gallium halide such as gallium chloride; indium halide such as indium chloride; thallium halide such as thallium chloride. Examples of Group VIII halides include one or more of iron halides such iron chlorides and iron bromides; cobalt halides such as cobalt chloride and cobalt bromide; and nickel halide such as nickel chloride and nickel bromide; rhodium halide such as rhodium chloride; and rhenium halide such as rhodium chloride. The preferred halide for the co-electrolyte is a strong Lewis acid such as aluminum trichloride or boron trichloride. Most preferred is aluminum trichloride.

The molar ratio of the alkali metal halide to the co-electrolyte halide(s) can be from about 1:1 to about 1.1:1. The alkali metal halide is preferably present in only a slight excess for ease of operability. The alkali metal halide and the co-electrolyte metal halide(s) can form a reaction product under the electrolysis conditions.

The halide-donating compound for the co-electrolyte is preferably a molecule capable of reacting with a Lewis acid, preferably a strong Lewis acid, by donating a halogen atom. Preferably the halide-donating compound is $RSO_2X$, $RP(O)X_2$, or combinations thereof where R is $—CX'_3$, $—N=PX_3$, $—(CX_2)_nCX_3$, or combinations of two or more thereof, X is a halogen atom, X' is hydrogen, a halogen, or combinations thereof, and n=3–7. Most preferably X is a chlorine atom. More preferably, the halide-donating compound is a largely or substantially inorganic compound. Especially preferred halide-donating compounds include, but are not limited to, methane sulfonyl chloride, trichlorophosphazophosphoryl chloride ($Cl_3P=NP(O)Cl_2$), trichlorophosphazosulfonyl chloride ($Cl_3P=NSO_2Cl$), and combinations of two or more thereof. These halide-donating compounds can be produced by any means known to one skilled in the art such as, for example, the means disclosed in J. Electrochem. Soc. Vol. 143 No. 11, pages 3548–3554, November 1996.

The halide-donating compound can be present in an approximately 1:1 ratio with the co-electrolyte halide(s), i.e., the halide-acceptor(s), excluding the amount of co-electrolyte halide(s) previously stated to be necessary in combination with the alkali metal halide. That is, the co-electrolyte halide(s) serves two functions, and the amounts required are additive. This 1:1 ratio combination can be present in any quantity as long as the reaction product of the alkali metal halide and co-electrolyte halide(s) is soluble in it at the low temperatures discussed above. This can vary with each such combination. For example, sodium tetrachloroaluminate, the reaction product of sodium chloride and aluminum trichloride, has a significant solubility in the above co-electrolytes and is different for each co-electrolyte. If a second co-electrolyte (Group IB, IIIA or Group VIII, for example) halide is present, the molar ratio of the total of the first and second co-electrolyte halides to the alkali metal halide can also be 1:1. For example, an electrolyte comprising methanesulfonyl chloride-aluminum trichloride-sodium chloride can have a corresponding molar ratio of 1:1.4:0.4, respectively. Of this mixture, 1.0 mol of aluminum trichloride is required for the methanesulfonyl chloride and 0.4 is required for the sodium chloride, making the total amount 1.4 moles.

The electrolyte composition can be produced by any means known to one skilled in the art. For example, an alkali metal can be combined with a co-electrolyte halide or a halide-donating compound followed by combining the resultant combination with a halide-donating compound or a co-electrolyte halide. Such combining can be mixing or reacting under any suitable condition. Wishing not to be bound by theory, an intermediate can be formed by contacting an alkali metal halide and co-electrolyte. The intermediate can then be electrolyzed to produce a desired alkali metal. For example, sodium tetrachloroaluminate, the reaction product of sodium chloride and aluminum trichloride, can be used for producing sodium under electrolysis condition.

The anode of an electrolysis cell can consist of electrically conductive carbon, nickel, an DSA® (dimensionally stable anode), a Group VIII metal oxide, or a Group VIII metal such as platinum, which is not corroded by the anodically liberated halogen such as, for example, chlorine gas. On the cathode side of the cell the cathode itself can consist of electrically conductive carbon, stainless steel, iron, nickel or other Group VIII metal. The diaphragm separating the anode and cathode is a porous, non-reactive material such as glass-fiber fabric, fritted glass, a porous ceramic material, asbestos or a non-reactive polymeric screen or fabric.

An alkali metal halide and any of the co-electrolytes can be individually introduced into an electrolysis cell in any order. They can also be introduced contemporaneously. For example, an alkali metal halide can be combined with any co-electrolyte (either co-electrolyte halide or halide-containing compound) before being introduced to an electrolysis cell.

According to the invention, moisture is preferably excluded because water can react with, and hydrolyze, a halide of an inorganic acid in the electrolyte. This can be achieved by constructing the cell in a gas-tight, hermetically sealed fashion. In order to achieve a high degree of space efficiency it is advantageous to construct the cell in the well-known stacked-multiple-flat-plate arrangement. Known electrochemical engineering practices are used in providing means for circulating and replenishing the electrolyte, for providing electrolysis current, for handling cathode product liquid alkali metal and anode product chlorine gas. The cell is generally operated in a continuous mode. Because of its low temperature operation the invention process is well suited for automated operation.

The overall design of the electrolytic cell can be based on the cylindrical cell design used for the Downs process, and can even be a modified Downs cell. Alternatively the design can be based on a horizontal bank of stacked vertical anode and cathode plates, such as those used for the production of caustic soda from aqueous sodium chloride. The cathode can be provided with a physical means for transporting cathodically produced mixture of liquid alkali metal and electrolyte to an external, heated collection chamber. During operation of the cell, the liquid alkali-electrolyte mixture produced can share in the cathode function with the cathode. Physical means for transporting liquid alkali metal away from the cathode can be machined channels or grooves, a system of holes, or use of porous materials having interconnected pores permitting molten alkali metal to flow into the collection vessel. There are numerous other ways of performing this function which one skilled in the art can devise depending on one's preference.

The liquid sodium metal from the electrolytic cell can be purified by heating the impure sodium to above 100° C., whereupon the sodium, which has a melting point of 97.5° C., forms a melt which floats on the surface of the remaining co-electrolyte. Sodium can then be separated from the co-electrolyte by decantation, filtration or other means. If desired, the sodium can be further purified by fractional crystallization or by solvent extraction, i.e., heating in a solvent, removing the bulk of the solvent by decantation, filtration or other means, and removing traces of solvent from the sodium by heating under vacuum. The above solvent should have some solubility for the co-electrolyte and essentially no solubility for the sodium. Preferably the solvent has a boiling point above 100° C. under process conditions. Preferred solvents are dioxane or other high-boiling polyethers.

Sodium can also be purified via formation of a dispersion with an inert hydrocarbon with a boiling point above the melting point of sodium, such as mineral spirits or mineral oil. These hydrocarbons are insoluble with the ionic liquid and have a lower density. Sodium can be purified by forming a dispersed sodium solution at a temperature above 100° C., followed by cooling and settling. High speed agitation (>2000 rpm) can be used to form the sodium dispersion. A dispersing agent such as one or more fatty acid can also optionally be added in this step. On stopping the agitation, the occluded ionic liquid forms a bottom layer containing any sodium chloride or other salts. The upper layer contains sodium in a dispersed form, useful for promoting many slow organic reactions.

A preferred process comprises (1) providing an electrolytic cell and an electrolyte composition comprising the alkali metal halide and a co-electrolyte containing the combination of (a) a halide or halides of Group IIIA, Group IB, or Group VIII elements and (b) a halide-donating compound; (2) carrying out the electrolysis in the electrolytic cell in the presence of the above electrolyte composition at a temperature below about 200° C., thereby producing the alkali metal, generally a layer of molten metal, at the cathode and halogen at the anode; (3) if the temperature used for step 2 is below the melting point of the alkali metal, especially in a continuous process, raising the process temperature, i.e., the electrolysis cell and electrolyte, to above the aforesaid melting point; (4) removing the layer of molten alkali metal from the electrolytic cell; (5) separating the alkali metal from any electrolyte impurity by any means known to one skilled in the art such as fractional crystallization or solvent extraction and solvent removal during which some electrolyte is recovered as recovered electrolyte; and optionally (6) recycling the recovered electrolyte. The scope and quantity of alkali metal halidem at least one halide, and halide-donating compound, electrolysis cell, process condition, etc. are the same as that disclosed above.

The above process can be carried out in a batch or continuous mode. The electrolysis process is preferably carried out at a temperature above the melting point of the alkali metal, if steps 1 to 4 are carried out continuously where additional alkali halide is added to the electrolysis cell as the alkali metal is continuously removed from the cell. For example, if the alkali metal is sodium, the above electrolysis is preferably carried out at a temperature below about 150° C., but above the melting point of sodium. Also preferably the invention is carried out in an electrolysis cell containing a porous diaphragm.

EXAMPLES

Example 1

Preparation of Room Temperature Ionic Liquids 1A. Synthesis of Trichlorophosphazosulfonyl Chloride-aluminum Trichloride-sodium Chloride Trichlorophosphazosulfonyl chloride was synthesized according to the procedures disclosed in J. Electrochem. Soc., Vol 143, No, 11, p. 3548 (1996). A room temperature (about 25° C.) ionic solution was prepared by initially adding trichlorophosphazosulfonyl chloride (188.7 g, 0.75 mole) to a 500 ml round-bottomed flask equipped with an overhead stirrer, thermocouple, and inert nitrogen blanket heated with a heating mantle. The solid was initially melted by heating to 40° C. under nitrogen. Aluminum trichloride (149.8 g, 1.125 mole) was slowly added as a solid over a one hour period, keeping the temperature at 40–45° C. The solution was then heated to 80° C. and sodium chloride (21.9 g, 0.375 mole) was added over a fifteen minute period. The solution was held for one hour at 80° C. and then cooled to room temperature. The solution was a clear brown solution with no sediment.

1B. Synthesis of Methanesulfonyl Chloride-aluminum Trichloride-sodium Chloride

A room temperature ionic solution was prepared by initially adding methanesulfonyl chloride (458.4 g, 4.0 mole) to a flask same as described above. Aluminum trichloride (746.8 g, 5.6 mole) was added over a three hour period, keeping the temperature below 50° C. The solution was then heated to 60° C. and sodium chloride (93.6 g, 1.6 mole) was added over 0.5 hour, keeping the temperature below 70° C. The reaction was cooled to room temperature to give a clear green solution.

1C. Synthesis of Trichlorophosphazophosphorylchloride ($Cl_3P=NPOCl_2$)-aluminum Trichloride-sodium Chloride Trichlorophosphazophosphorylchloride was synthesized according to the literature (see J. Electrochem. Soc., Vol. 143, No.11, p 3548 (1996)). A room temperature ionic liquid was prepared by the addition of trichlorophosphazophosphorylchloride (46.1 g, 0.17 mole) into a 250 ml round-bottomed flask in a dry box. The flask equipped as above was then warmed to 35° C. to melt under a nitrogen purge so the solution could be stirred. Aluminum trichloride (27.4 g, 0.20 mole) was added slowly under nitrogen over a 40 minute time period, keeping the temperature between 40–50° C. The solution was then heated to 100° C. and sodium chloride (2.0 g, 0.034 mole) was added over a 15 minute period. The solution was cooled to room temperature to give a clear, dark brown solution.

Example 2

An electrochemical H cell, as shown in FIG. 1, was used. The cell has an extra-coarse sintered glass frit (reference numeral 3) separating the anode (14) compartment and cathode (14) compartment, inlet (12 and 22) and outlet (11 and 21) for an argon purge for each of the anode and cathode compartments, and an Agilent® E3617A DC Power Supply (reference numeral 1) with 0–60V DC and 1.0 amp capacity. Reference numeral 2 is a solid brace while 13 and 24 respectively show anolyte (15) level and catholyte (25) level. The argon outlet for both the anode and cathode lead to an aqueous 33% potassium iodide scrubber in-line with a Tedlar® balloon gas sample collector. The anode was a vertical 10×12×2 mm nickel strip and the cathode a vertical 10×12×2 mm 316 stainless steel strip. The nickel anode was approximately 5 mm from the extra-coarse frit, the 316 ss cathode was approximately 10 mm wide, and the frit was 5 mm wide, so the electrodes were a total of 20 mm apart.

The potassium iodide scrubbers were used to trap chlorine co-product from the anode and to check the effluent from the cathode compartment for any chlorine that might have migrated across the sintered glass frit separator. Tedlar® balloon from the anode outlet was used to trap any volatile organic methyl chloride and other volatile organic byproducts from chlorine reaction with the methanesulfonyl chloride. Chlorine was analyzed by iodometric titration and the methyl chlorides by gas chromatography. Tedlar® balloon from the cathode was used to analyze hydrogen and any co-mixing of anode solutions.

An electrolyte (48.0 g) was used, which consists of methanesulfonyl chloride-aluminum trichloride-sodium chloride in a 1:1.4:0.4 molar ratio, respectively, together with 2 g excess sodium chloride in the cathode compartment. The argon flows were set at 1.6 ml/min for the anode and the cathode compartments. The electrolytes were heated to 50° C. in an oil bath. The voltage was increased to 30V. The voltage was held constant for 1.8 hours to give a current in the range of 0.07–0.14 amps for an integrated average of 0.10 amps (a theoretical chlorine production of 3.32 mmol). During the running time bubbles were observed at the anode and black dendrils were formed on the face of the cathode.

At the end of the run the power was turned off and both anode and cathode compartments were purged with argon at 50° C. into the scrubber solutions to remove any dissolved chlorine and other soluble volatiles. Two argon sparges of 45 and 30 minutes each were made to free the solution of dissolved gases. A total of 2.48 mmol chlorine (74.7% efficiency) was recovered from the anode caustic scrubber by iodometric titration and 0.02 mmol of chlorine (0.8% of total) incorporated into a mixture of methyl chloride, methylene chloride, chloroform, and carbon tetrachloride from the Tedlar® balloon. The cathode showed no chlorine from the caustic scrubber and 0.04 mmol of hydrogen from the GC analysis of the Tedlar® balloon.

The dendrils on the cathode were confirmed by x-ray diffraction and electron microscopy to be a mixture of metallic sodium with traces of ionic bath components. No elemental aluminum was detected by x-ray diffraction, showing that aluminum ion was not reduced to aluminum metal.

Example 3

The same electrochemical H-cell and analyses used in Example 2 were used here. An electrolyte (71.6 g) was used consisting of trichlorophosphazosulfonyl chloride-aluminum trichloride-sodium chloride in a 1:1.5:0.5 molar ratio together, respectively, with 2 g excess sodium chloride in the cathode compartment. The argon flows were set at 4.4 ml/min for the anode and cathode compartments. The electrolyte was heated to 103° C. in an oil bath and the voltage was increased to 29.9V. The voltage was held constant for three hours to give a current in the range of 0.13–0.21 for an integrated average of 0.19 amps (a theoretical chlorine production of 10.9 mmol). A total of 6.6 mmol chlorine (60.6% efficiency) was recovered. The sodium together with bath impurities was scraped in an inert atmosphere dry box from the cathode and confirmed by x-ray diffraction and volumetric hydrogen measurement on treatment with anhydrous methanol (10.2 mmol, 46.7% efficiency in sodium).

The cell was run for an additional 10 hours at 103° C. at 29.9V. The current remained in the 0.12–0.20 amp range for an additional 10 hours with no noticeable sign of bath decomposition. The chlorine efficiency averaged 81% over this time. The sodium was scraped from the cathode at 3–4 hour intervals. It was analyzed by hydrogen volume measurement on addition of methanol. The sodium efficiency averaged 55% by this technique. The sodium was also confirmed by x-ray diffraction. As before, the dendrils on the cathode were confirmed by x-ray diffraction and electron microscopy to be a mixture of metallic sodium with traces of the ionic bath components, with no elemental aluminum.

Example 4

The same electrolyte and electrochemical H-cell used in Example 3 was used here. The cell conditions were also the same except the electrolyte was heated to 150° C. at the same 29.9 V. The voltage was held constant for 4.25 hours to give a current in the 0.17–0.21 amp range for 4.25 hours with no sign of bath decomposition. The measured chlorine efficiency averaged about 105% during this time (the estimated experimental error in analysis is about +5% to −5%). Most of the sodium was floating on the top of the electrolyte solution, and was filtered. A small amount of sodium was attached to the cathode and was removed by scraping. The total recovered sodium was 85% of the theoretical amount of sodium, as determined by hydrogen volume analysis.

Example 5

The same electrolyte and H-cell was used as Example 3. The electrolyte was heated to 105° C. and the voltage was increased to 29.9V for 5.0 hours to give a current in the 0.11–0.13 amp range (a theoretical chlorine production of 12.1 mmol). A total of 6.3 mmol of chlorine was recovered (51.9% efficiency). Sodium was filtered and the electrodes were scraped of sodium.

The same bath was recycled for the identical run to give a 49.6% chlorine efficiency. These runs demonstrate the robustness of the baths for recycle.

Example 6

An electrolyte (66.8 g) was used consisting of trichlorophosphazophosphorylchloride ($Cl_3P{=}NPOCl_2$)-aluminum trichloride-sodium chloride in a 1:1.17:0.17 molar ratio together, respectively, with 2 g excess sodium chloride in the cathode compartment. The argon flows were set at 4.4 ml/min as in Example 3. The electrolyte was heated to 103° C. in an oil bath and the voltage was increased to 50V. The voltage was held constant for 3.5 hours to give current in the range 0.045–0.10 amps(theoretical chlorine production of 5.0 mmol). A total of 2.48 mmol $Cl_2$ was determined by iodometric titration (49% efficiency). As before, the dendrils on the cathode were confirmed by x-ray diffraction and electron microscopy to be a mixture of metallic sodium with traces of the ionic bath components, with no elemental aluminum.

The above experiments demonstrate the preparation of sodium metal electrochemically at low temperatures in the presence of an ionic salt solution. The largely or substantially inorganic salt electrolyte is liquid with low viscosity at room temperature and unreactive with co-product chlorine and sodium metal under the reaction conditions. Under the same conditions these largely or substantially inorganic electrolytes show significantly higher current densities than organic electrolytes and allow a lower electrolysis temperature and process ease of operation because of their lower melting points. They also show little or no reactivity with nascent chlorine co-product.

A low temperature process can offer many potential advantages such as, for example:
  More space and labor efficient stacked multiple flat electrode assembly usually used in electrochemical practice rather than the concentrically cylindrical cathode and anode configuration required at the high temperature (>600° C. ) of the Downs Process,
  Energy and operability advantages of the lower temperatures,
  Reduction of chlorine release and exposure potential, and
  Dramatic reduction in cost of manufacturing These largely or substantially inorganic electrolytes have the advantages of lower melting points leading to lower electrolysis temperatures, higher current densities under comparable conditions (6 fold increase), and are generally less expensive and more commercially viable.

What is claimed is:

1. A process for producing an alkali metal comprising introducing an electrolyte into an electrolytic cell and carrying out electrolysis with said electrolyte to produce said alkali metal at the cathode and halogen at the anode of said cell wherein said electrolyte comprises or is produced by combining at least one alkali metal halide and a co-electrolyte; said co-electrolyte comprises (1) at least one halide selected from the group consisting of Group IB halide, Group IIIA halide, Group VIII halide, and combinations of two or more thereof and (2) a halide-donating compound, which is capable of reacting with a Lewis acid by donating a halogen atom.

2. A process according to claim 1 wherein said process is carried out under a condition in which a molten layer of said alkali metal is produced.

3. A process according to claim 2 wherein said process is carried out at a temperature below about 200° C., but is higher than the melting point of said alkali metal.

4. A process according to claim 3 wherein said halide-donating compound is $RSO_2X$, $RP(O)X_2$, or combinations thereof; R is $-CX'_3$, $-N=PX_3$, $-(CX_2)_nCX_3$, or combinations of two or more thereof; X is halogen; X' is hydrogen, halogen, or combinations thereof; and n=3–7.

5. A process according to claim 2 wherein said halide-donating compound is $RSO_2X$, $RP(O)X_2$, or combinations thereof; R is $-CX'_3$, $-N=PX_3$, $-(CX_2)_nCX_3$, or combinations of two or more thereof; X is halogen; X' is hydrogen, halogen, or combinations thereof; and n=3–7.

6. A process according to claim 1 wherein said at least one halide is selected from the group consisting of aluminum halide, boron halide, antimony halide, iron halide, cobalt halide, nickel halide, and combinations of two or more thereof.

7. A process according to claim 6 wherein said halide-donating compound is $RSO_2X$, $RP(O)X_2$, or combinations thereof; R is $-CX_3$, $-N=PX_3$, $-(CX_2)_nCX_3$, or combinations of two or more thereof; X is halogen; X' is hydrogen, halogen, or combinations thereof; and n=3–7.

8. A process according to claim 7 wherein said halide-donating compound is selected from the group consisting of methanesulfonyl chloride, trichlorophosphazosulfonyl chloride, trichlorophosphazophosphoryl chloride, and combinations of two or more thereof.

9. A process according to claim 8 said co-electrolyte comprises aluminum chloride and methanesulfonyl chloride.

10. A process according to claim 8 wherein said co-electrolyte comprises aluminum chloride and trichlorophosphazosulfonyl chloride.

11. A process according to claim 8 wherein said co-electrolyte comprises aluminum chloride and trichlorophosphazophosphoryl chloride.

12. A process according to claim 1 wherein said halide-donating compound is $RSO_2X$, $RP(O)X_2$, or combinations thereof; R is $-CX'_3$, $-N=PX_3$, $-(CX_2)_nCX_3$, or combinations of two or more thereof; X is halogen; X' is hydrogen, halogen, or combinations thereof, and n=3–7.

13. A process according to claim 1 comprising raising the temperature of said cell to higher than the melting point of said alkali metal if said temperature is below the melting point of said alkali metal.

14. A process for producing an alkali metal comprising introducing an electrolyte into an electrolytic cell and carrying out an electrolysis with said electrolyte, which comprises at least one alkali metal halide and a co-electrolyte wherein said co-electrolyte comprises (a) at least one halide selected from the group consisting of Group IB halide, Group IIIA halide, and Group VIII halide and (b) a halide-donating compound wherein said process is carried out under a temperature below about 200° C.;

said process is carried out such that a molten layer of said alkali metal is produced at the cathode and halogen is produced at the anode of said cell;

said at least one halide is selected from the group consisting of aluminum halide, boron halide, antimony halide, iron halide, cobalt halide, nickel halide, and combinations of two or more thereof; and said halide-donating compound is $RSO_2X$, $RP(O)X_2$, or combinations thereof; R is $-CX'_3$, $-N=PX_3$, $-(CX_2)_nCX_3$, or combinations of two or more thereof; X is halogen; X' is hydrogen, halogen, or combinations thereof, and n=3–7.

15. A process according to claim 14 comprising raising said temperature to higher than the melting point of said alkali metal if said temperature is below the melting point of said alkali metal.

16. A process according to claim 15 wherein X or X' is chlorine.

17. A process according to claim 16 wherein said halide-donating compound is selected from the group consisting of methanesulfonyl chloride, trichlorophosphazosulfonyl chloride, trichlorophosphazophosphoryl chloride, and combinations of two or more thereof.

18. A process according to claim 16 wherein said co-electrolyte comprises aluminum chloride and methanesulfonyl chloride.

19. A process according to claim 18 wherein said alkali metal is sodium and said alkali metal halide is sodium chloride.

20. A process according to claim 16 wherein said co-electrolyte comprises aluminum chloride and trichlorophosphazosulfonyl chloride.

21. A process according to claim 20 wherein said alkali metal is sodium and said alkali metal halide is sodium chloride.

22. A process according to claim 16 wherein said co-electrolyte comprises aluminum chloride and trichlorophosphazophosphoryl chloride.

23. A process according to claim 22 wherein said alkali metal is sodium and said alkali metal halide is sodium chloride.

24. A process for producing sodium comprising electrolyzing, in an electrolytic cell, an electrolyte comprising (1) sodium chloride and (2) a co-electrolyte selected from the group consisting of (a) aluminum chloride and methanesulfonyl chloride, (b) aluminum chloride and trichlorophosphazosulfonyl chloride, (c) aluminum chloride and trichilorophosphazophosphoryl chloride, and (d) combinations of any two of (a), (b), and (c) wherein said process is carried out under a temperature below about 200° C. to produce sodium at the cathode and chloride at the anode of said cell.

25. A process according to claim 24 wherein said process is carried out under a condition such that a layer of molten sodium is produced.

26. A process according to claim 25 comprising raising said temperature to higher than the melting point of sodium if said temperature is below the melting point of sodium.

27. A process according to claim 26 further comprising removing said layer of molten sodium from said cell.

28. A process according to claim 27 further comprising separating said sodium thereby optionally producing a recovered electrolyte.

29. A process according to claim 28 further comprising recycling said recovered electrolyte.

30. A process according to claim 29 wherein said recovered electrolyte comprises said sodium chloride, said aluminum chloride, and said methanesulfonyl chloride.

31. A process according to claim 29 wherein said recovered electrolyte comprises said sodium chloride, said aluminum chloride, and said trichiorophosphazosulfonyl chloride.

32. A process according to claim 29 wherein said recovered electrolyte comprises said sodium chloride, aluminum chloride, and said trichlorophosphazophosphoryl chloride.

* * * * *